Nov. 17, 1936.    J. F. CALVERT    2,061,502
METHOD OF DIMINISHING CORONA AND INSULATION HEATING AT THE ENDS OF SLOTS
Filed April 12, 1934

WITNESSES:

INVENTOR
John F. Calvert.
ATTORNEY

Patented Nov. 17, 1936

2,061,502

UNITED STATES PATENT OFFICE 2,061,502

METHOD OF DIMINISHING CORONA AND INSULATION HEATING AT THE ENDS OF SLOTS

John F. Calvert, Irwin, Pa., assignor to Westinghouse Electric & Manufacturing Company, East Pittsburgh, Pa., a corporation of Pennsylvania Application April 12, 1934, Serial No. 720,223

7 Claims. (Cl. 171—206)

The invention relates generally to the protection of insulated conductors, and more particularly to the protection of the insulated conductors employed in the coils of dynamo-electric machines.

The object of the invention is to produce a voltage gradient along the outside surface of an insulated conductor which, for test and normal voltage ratings, will restrict the electrostatic discharge without causing harmful heating of the insulation.

Other objects of the invention will, in part, be obvious and, in part, appear hereinafter.

The invention accordingly is disclosed in the accompanying drawing and comprises the features of construction, combination of elements and arrangement of parts which will be exemplified in the structure hereinafter set forth and the scope of the application of which will be indicated in the claims.

Figure 1:
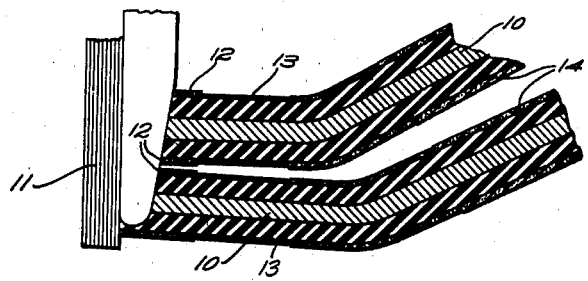

For a fuller understanding of the nature and the objects of the invention, reference may be had to the following detailed description taken in conjunction with the accompanying drawing, in which:

Figure 1 is a view partly in side elevation and partly in section of a portion of a generator armature showing a protecting system applied in accordance with this invention.

Figure 2:
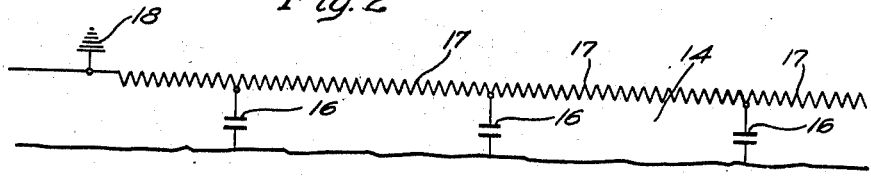
Figure 3:
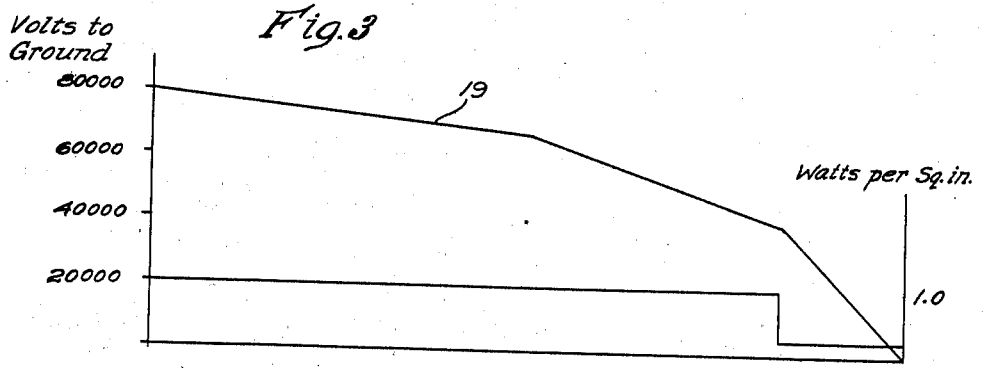

Fig. 2 is a diagram illustrating the characteristics of a conductor having the protective system of this invention applied, as shown in Fig. 1, and Fig. 3 is a copy of curves showing the watts consumed per square inch with surface area and the voltage gradient obtained along the end loop portions of the coils of a dynamo-electric machine when provided with a protective system arranged in accordance with that shown in Fig. 1.

Referring now to the drawing, and Fig. 1 in particular, the conductors or windings 10 are illustrated as extending beyond the armature iron 11 forming what may be described as end loop portions. In winding dynamo-electric machines insulated conductors are carried in slots provided in the armature iron 11. The size of the insulated conductor employed in winding the armature will depend upon the conditions to be met.

It is common practice in present-day construction of dynamo-electric machines to coat the armature windings with a conducting material which makes electrical contact with the iron. Many suitable conducting materials are available. Good results have been obtained by using a material known to the trade as aquadag. This material is essentially a mixture of a graphite and water paint.

In this specification, aquadag will be referred to as a conducting material. When painted on windings in the manner in which it is utilized in the present invention its resistance is of the order of 100 to 3000 ohms per square inch of surface area with the paint thickness employed.

In the illustration, Fig. 1, the aquadag 12 is shown as extending slightly beyond the armature iron, but this is not essential for the application of the present protective system. However, in many instances, satisfactory results are obtained by extending the aquadag slightly beyond the iron to prevent the concentration of voltage at a point adjacent the iron 11.

In the present showing in Fig. 1, a semi-conducting material 13 is applied to the surface of the insulation 14 of the conductors utilized in winding the armature. There are many suitable semi-conducting materials that may be employed with success. In experiments carried on to determine the utility of this invention the semi-conducting material applied was in the nature of a paint. This paint was prepared by carefully baking wood to provide a predetermined grade of charcoal which is ground in a ball mill to the required fineness and then mixed with an air-drying varnish and gasoline.

The semi-conducting material may be applied to insulated conductors whether employed as an armature winding or otherwise in different manners. In the embodiment illustrated in Fig. 1, it is painted on to provide different thicknesses of the semi-conducting material of the order of 1 to 10 mils. The conductivity of the semi-conducting material may also be varied by employing charcoal treated to give it predetermined characteristics. As illustrated, there are sections of the semi-conducting material, the section next the armature iron offering the least ohmic value of resistance. The sections increase in ohmic value of resistance per square inch of surface area progressing outwardly from the iron.

The most desirable practice in applying the semi-conducting material would be to apply it in gradually decreasing thickness from the iron outwardly thereby to obtain a gradually increasing resistance of predetermined value. However, the application of the semi-conducting paint or material in this manner offers some problems which make it more practical to apply the paint in sections. The making of the sections short approaches the theoretically correct method of applying the semi-conducting material.

The resistance of the different sections may vary with the conditions to be met. It has been found that the ohmic resistance varying from $1 \times 10^6$ ohms to $1500 \times 10^6$ ohms per square inch of conductor surface gives satisfactory results with the thickness of paint films employed. However, it is to be understood that it is not required that such values be adhered to since good results may be obtained under the different operating conditions with values which are entirely different.

When coils are provided with a semi-conducting material in the manner illustrated and described, the voltage on the insulated surface of the conductor is so distributed that there is no voltage gradient anywhere on the surface of the insulated conductor which will cause an electrostatic discharge or heating of the insulation, which may cause deterioration.

When semi-conducting material is applied to the insulated conductor, as shown in Fig. 1, the result obtained is substantially that illustrated by the circuit in Fig. 2, that is, between the copper of the conductor and the outside surface of the insulation there is the equivalent of a plurality of condensers 16 arranged in parallel circuit relation representing the insulation and connected to a plurality of resistors 17 connected in series circuit relation representing the semi-conducting material 13. The resistors are grounded as shown at 18 through the aquadag to the armature iron.

A voltage gradient such as disclosed at 19 in Fig. 3 was calculated for the arrangement shown in Fig. 1 and when this coil was tested there was neither visible electrostatic discharge nor heating which would damage the insulation, which shows that energy is dissipated in each section of semi-conducting material. The heating of the insulation was at the rate of about 1.0 watt per square inch of surface area which was not harmful during a one minute test. Were the test for a longer time, the arrangement could be modified to give less heating without corona discharge.

The resistance of the sections of the semi-conducting material applied to the insulated conductor ranged from $11 \times 10^6$ ohms per square inch to $680 \times 10^6$ ohms per square inch for the thickness of the paint film employed. When this coil was being tested there was no visible corona discharge, and since the heating was low, the method of applying the semi-conducting material was proved to be very satisfactory. The coil for a dynamo-electric machine tested was designed for an operating voltage of about 30,000 volts. During the test, the coil was operated for a minute at twice normal rated voltage plus 20,000 volts, which in the above test would mean about 80,000 volts. The test results demonstrate the value of the invention and is a solution of a problem in the protection of insulated conductors particularly those utilized in winding the armatures of dynamo-electric machines.

In conclusion, it is pointed out that while the illustrated example constitutes a practical embodiment of the invention, I do not limit my invention to the exact details shown, since modifications of the same may be considerably varied without departing from the spirit of the invention as defined in the appended claims.

I claim as my invention:

1. In a dynamo-electric machine, in combination, armature iron provided with a plurality of slots, an armature winding disposed in the slots, the armature winding being an insulated conductor wound in a predetermined manner, the armature winding extending beyond the armature iron presenting end loop portions, semi-conducting material applied to the end loop portions extending from the armature iron outwardly, different sections of the semi-conducting material being of different ohmic resistance and electrically connected, the ohmic resistance of the sections progressing outwardly along the conductor increasing with distance from the armature iron thereby to distribute the surface voltage along the armature winding to restrict the corona discharge and armature heating during test or normal operation to a predetermined amount suitable for operation.

2. In a dynamo-electric machine in combination, armature iron provided with a plurality of slots, an insulated conductor carried by the armature iron and disposed in the slots providing an armature winding, the insulated conductor extending beyond the iron forming end loop portions, a conducting material applied to the portions of the armature winding disposed in the slots, a semi-conducting material applied to the end loop portions, the semi-conducting material being in electrically connected sections having different ohmic resistance values, the ohmic resistance of the sections progressing outwardly along the conductor increasing with the distance from the armature iron to produce a voltage gradient along the end loop portion of the armature winding thereby to limit the corona discharge and the heating of the insulation to predetermined values during test or normal operation.

3. A voltage distributing system for dissipating electrostatic charges for protecting insulating conductors in the vicinity of a support comprising a continuous layer of semi-conducting material applied to the insulated conductor for dissipating electro-static charges, the semi-conducting material carried by the conductor decreasing in conductance from the support outwardly along the conductor, causing a predetermined voltage gradient along the surface of the insulated conductor.

4. A system for protecting an insulated conductor carried by a support comprising conducting material applied to the surface of the insulated conductor, the conducting material extending beyond the support, a continuous layer of semi-conducting material applied to the surface and extending along the insulated conductor, the semi-conducting material being so applied to give a decrease in conductance from the support outwardly along the conductor, the semi-conducting material extending beyond the conducting material to produce a voltage gradient at the surface of the conductor which will restrict corona discharge and heating of the insulation to give satisfactory operation under test and normal operating conditions.

5. A system for protecting an insulated conductor carried by a support comprising a coating of semi-conducting material applied to the surface of the insulated conductor, the semi-conducting material being applied in electrically connected sections, each section progressing outwardly from the support along the conductor being of lower conductance than the next section closer to the support.

6. A system for protecting an insulated conductor carried by a support comprising semi-conducting material applied to the surface of the insulated conductor in electrically connected sections, the sections of semi-conducting material progressing outwardly from the support along the conductor possessing decreasing values of conductivity, thereby producing a voltage gradient along the conductor which restricts corona discharge and the heating of the insulation to predetermined amounts when the conductor is energized which enables the operation for which the conductor is provided at rated voltages.

7. A system for protecting an insulated conductor carried by a support comprising, in combination, a semi-conducting material applied to the insulated conductor in sections which are electrically connected, the ohmic resistance of the sections progressing outwardly from the support along the conductor being of predetermined values increasing from the support outwardly to produce a voltage gradient which does not produce a corona discharge or heating of the insulation that is unsatisfactory for economical operation.

JOHN F. CALVERT.